United States Patent [19]
Klynn et al.

[11] Patent Number: 5,155,750
[45] Date of Patent: Oct. 13, 1992

[54] STEREOSCOPIC RADIOGRAPHIC INSPECTION SYSTEM

[75] Inventors: Lee M. Klynn, Los Altos; Richard C. Barry; Robert A. Buchanan, both of Palo Alto, all of Calif.

[73] Assignee: Lockheed Missiles & Space Company, Inc., Sunnyvale, Calif.

[21] Appl. No.: 836,531

[22] Filed: Feb. 19, 1992

Related U.S. Application Data

[63] Continuation of Ser. No. 614,557, Nov. 13, 1990, abandoned, which is a continuation of Ser. No. 137,642, Dec. 24, 1987, abandoned.

[51] Int. Cl.$^5$ .............................................. G21K 4/00
[52] U.S. Cl. ........................................ 378/42; 378/99
[58] Field of Search ................... 378/41, 42, 62, 99; 358/111, 88, 89, 92

[56] References Cited

U.S. PATENT DOCUMENTS

| | | | |
|---|---|---|---|
| 2,275,857 | 3/1942 | Lowitsch | 378/41 |
| 3,076,054 | 1/1963 | Simon | 378/41 |
| 3,309,519 | 3/1967 | Euler et al. | 378/41 |
| 3,422,264 | 1/1969 | Martina | 378/41 |
| 3,585,382 | 6/1971 | Suganuma | 358/92 |
| 3,665,184 | 5/1972 | Schagen | 378/41 |
| 4,135,089 | 1/1979 | McIntyre | 378/41 |
| 4,214,267 | 7/1990 | Roese et al. | 378/42 |
| 4,430,568 | 2/1984 | Yoshida et al. | 378/57 |
| 4,431,265 | 2/1984 | Benton | 358/88 |
| 4,472,737 | 9/1984 | Iwasaki | 378/99 |
| 4,559,556 | 12/1985 | Wilkins | 358/88 |
| 4,578,802 | 3/1986 | Itoh | 378/99 |
| 4,613,899 | 9/1986 | Kuwano et al. | 358/88 |
| 4,625,290 | 11/1986 | White | 358/88 |
| 4,633,494 | 12/1986 | Klansz | 378/99 |
| 4,658,410 | 4/1987 | Haendle et al. | 378/41 |
| 4,734,756 | 3/1988 | Butterfield et al. | 358/88 |
| 4,737,972 | 4/1988 | Schoolman | 378/41 |
| 4,769,701 | 9/1988 | Sklebitz et al. | 378/41 |

FOREIGN PATENT DOCUMENTS

| | | | |
|---|---|---|---|
| 0030717 | 3/1979 | Japan | 358/88 |
| 57-93241 | 6/1982 | Japan | 378/41 |
| 0140788 | 8/1984 | Japan | 358/89 |
| 2101446 | 1/1983 | United Kingdom | 358/88 |

Primary Examiner—Craig E. Church
Attorney, Agent, or Firm—John J. Morrissey

[57] ABSTRACT

An object (10) to be radiographically inspected is irradiated in a sequence of different positions with respect to an X-ray beam emitted by a single source (12). A single X-ray detector in an imaging system (13) produces a series of electronic signals corresponding to the sequence of positions at which irradiation of the test object (10) occurs. The series of electronic signals is converted to a pair of series of signals, wherein one series of the pair is delayed with respect to the other series of the pair. The pair of series of signals is displayed as a stereoscopic pair of series of visual images corresponding to different positions at which the test object (10) is irradiated by the X-ray beam. A viewing system (19) causes each eye of an observer to see a different series of visual images, whereby the observer is enabled to preceive a series of stereoscopic X-ray images of the test object (10).

35 Claims, 4 Drawing Sheets

FIG_1

FIG_4

FIG_3

STEREOSCOPIC RADIOGRAPHIC INSPECTION SYSTEM

RELATED APPLICATIONS

This application is a continuation of Ser. No. 07/614,557 filed Nov. 13, 1990, and now abandoned which is a continuation of Ser. No. 07/137,642 filed Dec. 24, 1987, and now abandoned.

TECHNICAL FIELD

This invention pertains generally to the field of radiographic inspection, and more particularly to a technique for acquiring and displaying stereoscopic radiographic images.

BACKGROUND OF THE INVENTION

Techniques developed in the prior art for stereoscopically displaying radiographic images have generally required the use of two radiation sources and two radiation detectors. According to the prior art, two radiation sources are arranged with respect to two radiation detectors so that a test object is irradiated by two radiation beams that are angularly displaced from each other, whereby two images of the test object are acquired and viewed stereoscopically.

Where steroscopic imaging was required to be performed in real time in the prior art, techniques were developed that used two radiation sources and a single radiation detector for acquiring a stereoscopic pair of radiographic images of the test object. The resulting stereoscopic pair of radiographic images could generally be displayed by conventional means.

No technique was developed in the prior art for stereoscopically acquiring and displaying radiographic images in real time using only a single radiation source and a single radiation detector.

SUMMARY OF INVENTION

It is an object of the present invention to provide a technique for stereoscopically acquiring and displaying radiographic images in substantially real time using only a single radiation source and a single radiation detector.

In accordance with the present invention, a test object that is to be radiographically inspected is positioned in a radiation beam so that a first electronic image can be formed, and the test object is then displaced relative to the source of the beam so that a second electronic image can be formed, whereby the first and second electronic images represent two views of the test object slightly displaced from each other. A feature of the present invention is that the first image is electronically delayed with respect to the second image so that the first and second images can be displayed as a stereoscopic pair.

BEST MODE OF CARRYING OUT THE INVENTION

Figure 1:
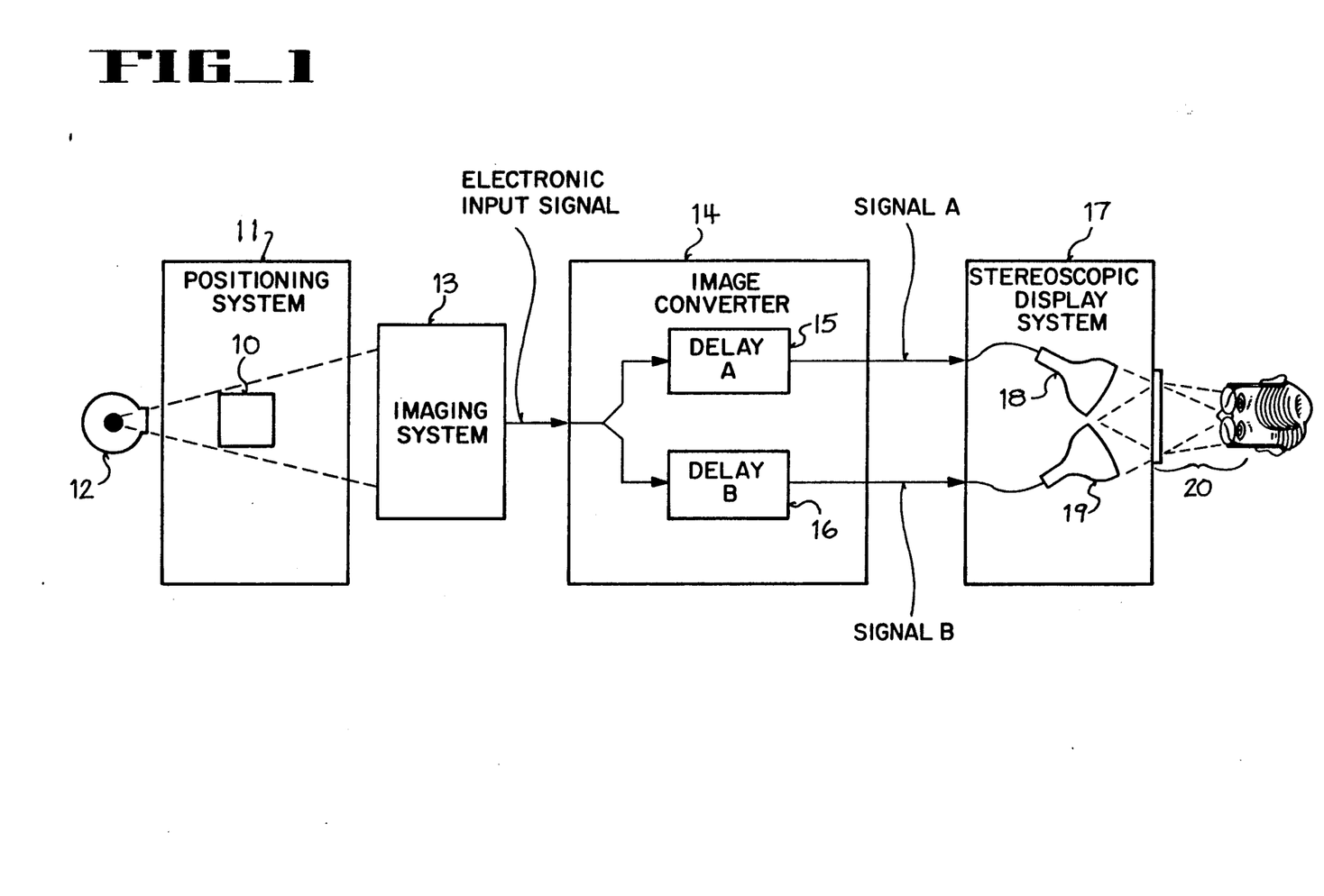
FIG. 1 is a schematic illustration of a stereoscopic radiographic inspection system according to the present invention.

As illustrated in FIG. 1, a test object 10 for which a stereoscopic radiographic image is to be displayed is supported by means of a positioning system 11 in a beam of penetrating radiation emanating from a radiation source 12. To facilitate illustration of the invention, the test object 10 is shown as having a cubic configuration, and is positioned symmetrically with respect to the beam during irradiation. However, in principle, the test object 10 need not be of regular configuration, and need not be symmetrically disposed with respect to the irradiating beam. The invention is described herein specifically in terms of an X-ray inspection system in which the radiation source 12 produces an X-ray beam. However, in principle, the radiation source 12 could be a gamma ray source, a neutron source, or any other penetrating radiation source.

The positioning system 11 can be operated (either manually or automatically) to cause relative motion of the test object 10 with respect to the X-ray beam produced by the X-ray source 12, so that the X-ray beam can irradiate the test object 10 in each one of a sequence of different positions. The motion system 11 could be a conventional conveyor system, which translates the test object 10 through the X-ray beam. In a typical embodiment of the invention, the test object 10 is translated through the X-ray beam in a direction perpendicular to a central axis of a cone of radiation emanating from the X-ray source 12 such that the central axis defines a direction of propagation of the X-ray beam. Alternatively, the positioning system 11 could be a device for rotating the test object 10 in the X-ray beam, in which case the test object 10 would typically be rotated about an axis perpendicular to the direction of propagation of the X-ray beam.

Motion of the test object 10 with respect to the X-ray source 12 could be produced during time intervals between sequential irradiations of the test object 10, although it is not a requirement of the invention that the test object 10 be fixed in position with respect to the X-ray beam during each irradiation. Regardless of the manner in which the test object 10 is irradiated, it is a requirement of the invention that a plurality of images of the test object 10 in a sequence of different positions be acquired.

Radiation that passes through the test object 10 during each sequential irradiation thereof is converted by an imaging system 13 into an electronic signal, which corresponds to the position of the test object 10 relative to the radiation source 12. When the radiation source 12 is an X-ray source, the imaging system 13 is an X-ray imaging system. Conventionally, the X-ray imaging system 13 described herein could comprise an image intensifier, or a phosphor screen, or a rare earth screen, which generates a visual image when activated by X-ray radiation impinging thereon. Conversion of the visual image into the electronic signal corresponding to the position of the test object 10 can be accomplished conventionally in the X-ray imaging system 13 by using, e.g., a video camera.

The electronic signal produced by the X-ray imaging system 13 during a particular irradiation of the test object 10 becomes an input to an image converter 14, which comprises means for producing a pair of electronic signals designated as "Signal A" and "Signal B". One signal of the pair (i.e., either Signal A or Signal B) could be substantially undelayed with respect to the electronic input signal produced by the X-ray imaging system 13, or both Signal A and Signal B could be delayed (but by different amounts) with respect to the electronic input signal. Signal A and Signal B are substantially identical to each other, but must be delayed in time by different amounts with respect to the electronic input signal.

The image converter 14 comprises a pair of image storage and delay systems 15 and 16, which operate on the electronic input signal to produce the unequally delayed Signal A and Signal B, respectively. In a particular application, one of the image storage and delay systems 15 or 16 could be a direct feed-through, in which case the delay produced thereby with respect to the electronic input signal would be substantially zero. The means utilized by the other image storage and delay system of the pair (or by both of them, when both Signal A and Signal B are to be delayed with respect to the electronic input signal) could be a conventional delay device such as, e.g., a video tape recorder, a digital buffer, a video disc, or a digital disc drive.

Signal A and Signal B become inputs to a stereoscopic display system 17, which produces a corresponding pair of visual X-ray images of the test object 10. Because of the time delay between Signal A and Signal B, the two visual X-ray images produced by the stereoscopic display system 17 correspond to two different positions of the test object 10 relative to the X-ray source 12. Thus, as illustrated in FIG. 1, Signal A could correspond to a present position of the test object 10 in the X-ray beam, in which case Signal B would correspond to a previous position of the test object 10 in the X-ray beam.

In the particular embodiment of the invention shown in FIG. 1, the stereoscopic display system 17 comprises a pair of conventional video monitors 18 and 19. Signal A is input to the monitor 18 and Signal B is input to the monitor 19. Since Signals A and B correspond to different positions of the test object 10, the monitors 18 and 19 display visual X-ray images of the test object 10 in correspondingly different positions. An optical viewing system 20 (which is schematically indicated in FIG. 1 to represent a plurality of different viewing system embodiments) causes the visual image displayed on the monitor 18 to be visible only to one eye of a human observer, and causes the visual image displayed on the monitor 19 to be visible only to the other eye of the observer. Thus, the observer is enabled to perceive the two visual images of the test object 10 as a stereoscopic pair.

As the test object 10 is moved by the positioning system 11 sequentially through different positions in the X-ray beam, successive irradiations of the test object 10 in the different positions are performed. The X-ray imaging system 13 thereby acquires a succession of visual images (i.e., a "moving picture") of the test object 10 in the different positions. The "moving picture" is then converted by the video camera (or by whatever other means is used) in the X-ray imaging system 13 into a series of electronic signals corresponding to the sequence of different positions of the test object 10. The series of electronic signals produced by the X-ray imaging system 13 becomes an input to the image converter 14, which then produces a pair of unequally delayed series of Signals A and B.

The pair of series of Signals A and B produced by the image converter 14 becomes an input to the stereoscopic display system 17, which produces a corresponding pair of series of visual X-ray images of the test object 10. The series of visual X-ray images corresponding to the series of Signal A electronic signals, and the series of visual images corresponding to the series of Signal B electronic signals, are presented by the optical viewing system 20 to different eyes of the observer during a time interval that is sufficiently short in terms of the physiology and phychology of human visual perception so that the two series of visual images are perceived by the observer as being substantially simultaneous.

The observer sees a series of visual X-ray images corresponding to the series of Signal A electronic signals with one eye, and a series of visual X-ray images corresponding to the series of Signal B electronic signals with the other eye, substantially simultaneously. Because of the timedelay between the Signal A series and the Signal B series of electronic signals, the series of visual X-ray images seen by the observer's right and left eyes, respectively, are attributable to successive irradiations of the test object at different positions in the X-ray beam. The time delay of the Signal A series relative to the Signal B series of electronic signals corresponds to the direction of displacement of the test object 10 relative to the X-ray source 12, so that the observer is enabled to perceive a "moving picture" of a series of visual X-ray images of the test object 10 stereoscopically.

Figure 2:
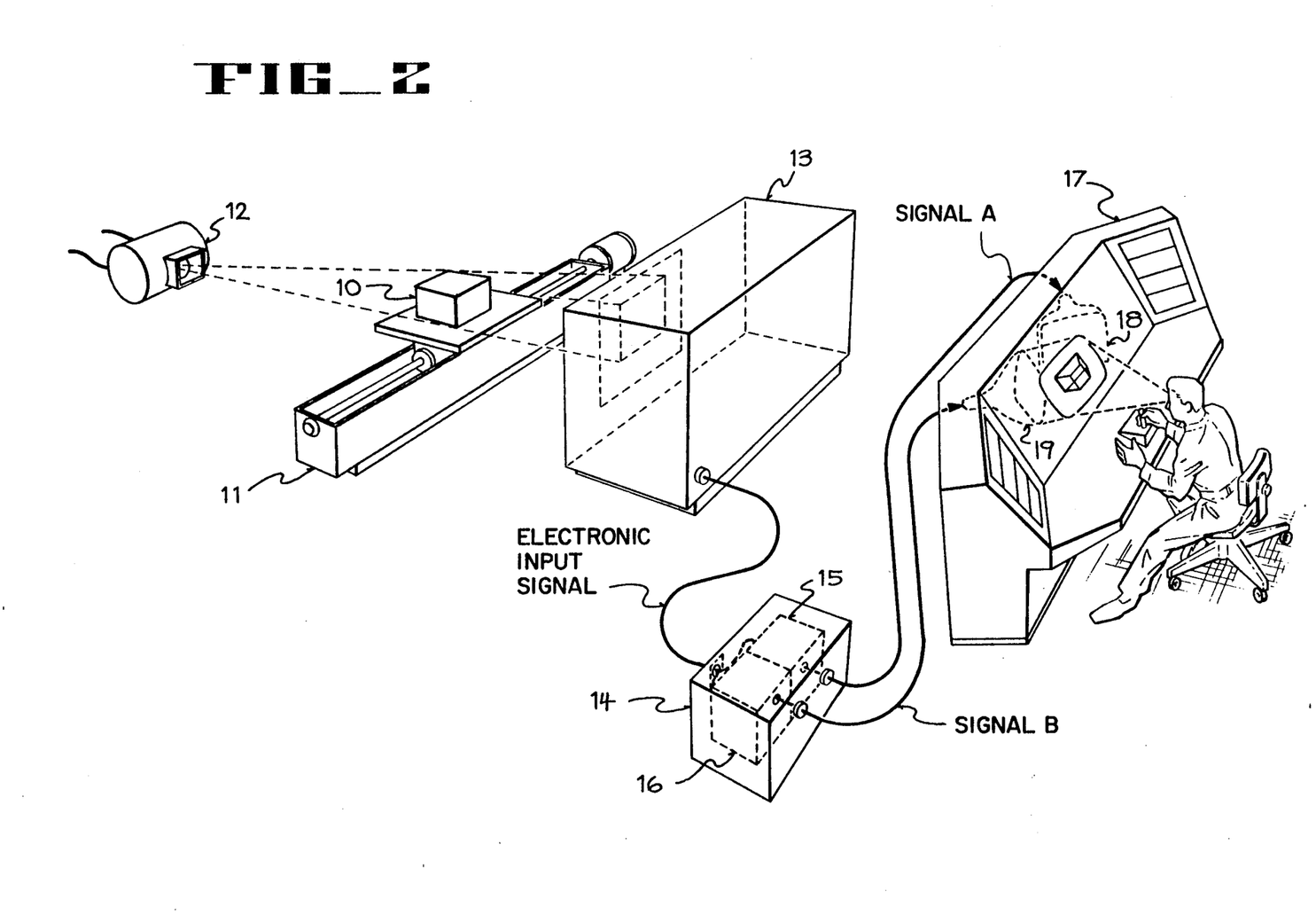
FIG. 2 is a perspective view of the stereoscopic radiographic inspection system illustrated schematically in FIG. 1.

A generalized illustration of equipment components for a stereoscopic radiographic apparatus as illustrated schematically in FIG. 1 is shown in perspective view in FIG. 2.

Figure 3:
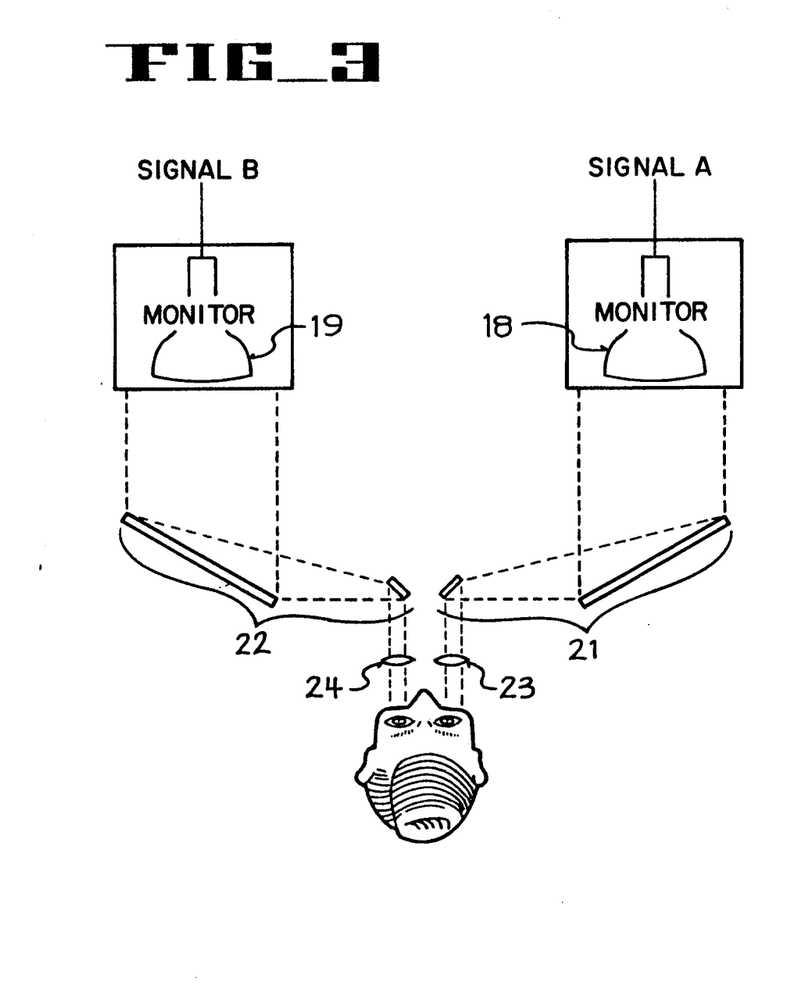
FIG. 3 is a schematic illustration of a first embodiment of the stereoscopic viewing technique shown in the stereoscopic radiographic inspection system of FIG. 1.
Figure 4:
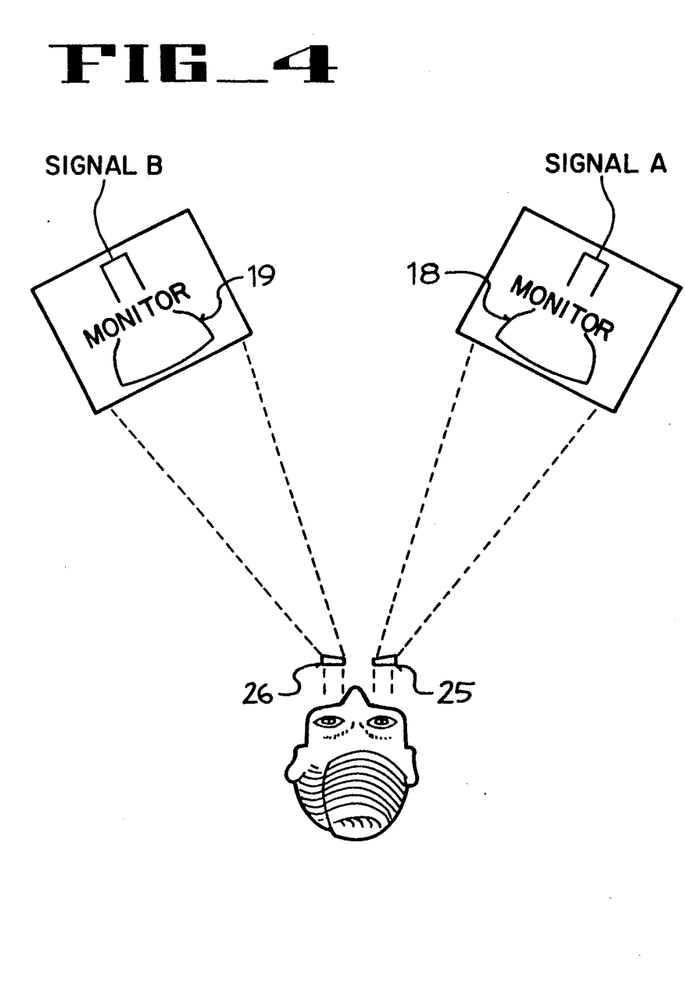
FIG. 4 is a schematic illustration of a second embodiment of the stereoscopic viewing technique shown in the stereoscopic radiographic inspection system of FIG. 1.

Several different embodiments are possible for the optical viewing system 20, which enables the human observer to perceive separate visual images (or separate series of visual images) on the monitors 18 and 19 in stereoscopic view. In an embodiment schematically illustrated in FIG. 3, the visual images (or series of visual images) displayed on the monitors 18 and 19, respectively, can be reflected to the right and left eyes, respectively, of the observer by corresponding optical systems 21 and 22, which could include mirrors and prisms; and the reflected images (or series of images) can be focussed onto the observer's right and left eyes, respectively, by corresponding lenses (or lens systems) 23 and 24. In an embodiment schematically illustrated in FIG. 4, the visual images (or series of visual images) displayed on the monitors 18 and 19, respectively, can be refracted by corresponding refracting systems 25 and 26 to the right and left eyes, respectively, of the observer. The refracting systems 25 and 26 could comprise, e.g., single prisms, or arrays of prisms and lenses.

Figure 5:
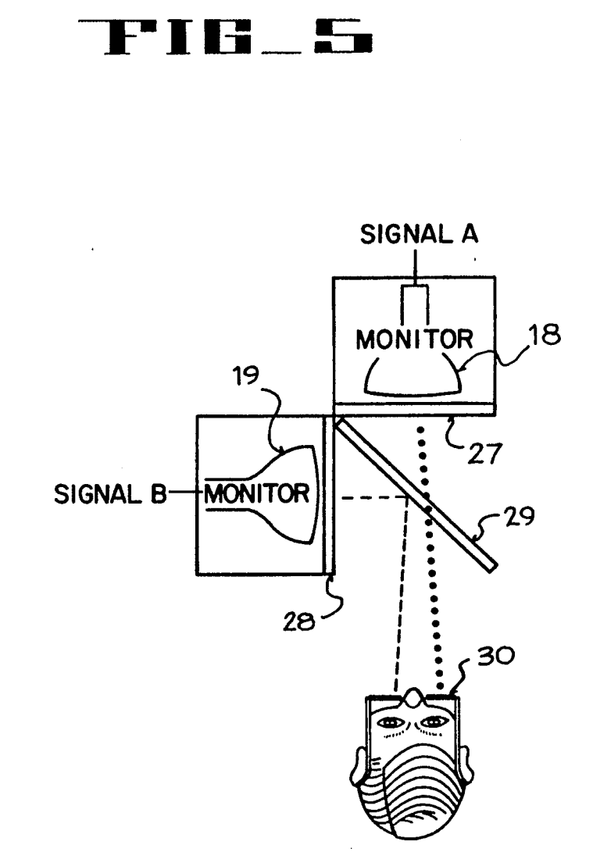
FIG. 5 is a schematic illustration of a third embodiment of the stereoscopic viewing technique shown in the stereoscopic radiographic inspection system of FIG. 1.

In another embodiment of the optical viewing system 20, as shown in FIG. 5, the separate visual images (or separate series of visual images) displayed on the monitors 18 and 19, respectively, are cross-polarized by means of corresponding polarizing screens 27 and 28. The cross-polarized visual images are then combined by a beamsplitter 29, and the combined visual images are seen by the observer through polarizing glasses 30. The polarizing glasses 30 cause the visual image (or series of visual images) on the monitor 18 to be visible only to the observer's right eye, and cause the visual image (or series of visual images) on the monitor 19 to be visual only to the observer's left eye.

Different configurations are also possible for the stereoscopic display system 17. For example, in the embodiment shown in FIG. 6, only a single monitor (e.g., the monitor 18) is required, in which case the pair of unequally delayed series of Signals A and B produced by the image storage and delay systems 15 and 16, respectively, of the image converter 14 becomes a pair of inputs to a stereoscopic display synchronizer 31. The stereoscopic display synchronizer 31 causes the Signal A series of electronic signals and the Signal B series of electronic signals, in sequence, to be presented as alternating display fields on the monitor 18. Simultaneously, a polarizing screen 32 positioned in front of the monitor 18 is synchronously switched by the stereoscopic display synchronizer 31 from one polarization to another. The observer wears a pair of polarizing glasses 33 to produce cross-polarization with respect to the polarizing screen 32, whereby the series of visual X-ray images displayed on the monitor 18 by the Signal A series of electronic signals is visible only to one eye of the observer, and the series of visual X-ray images displayed on the monitor 18 by the Signal B series of electronic signals is visible only to other eye of the observer.

Figure 6:
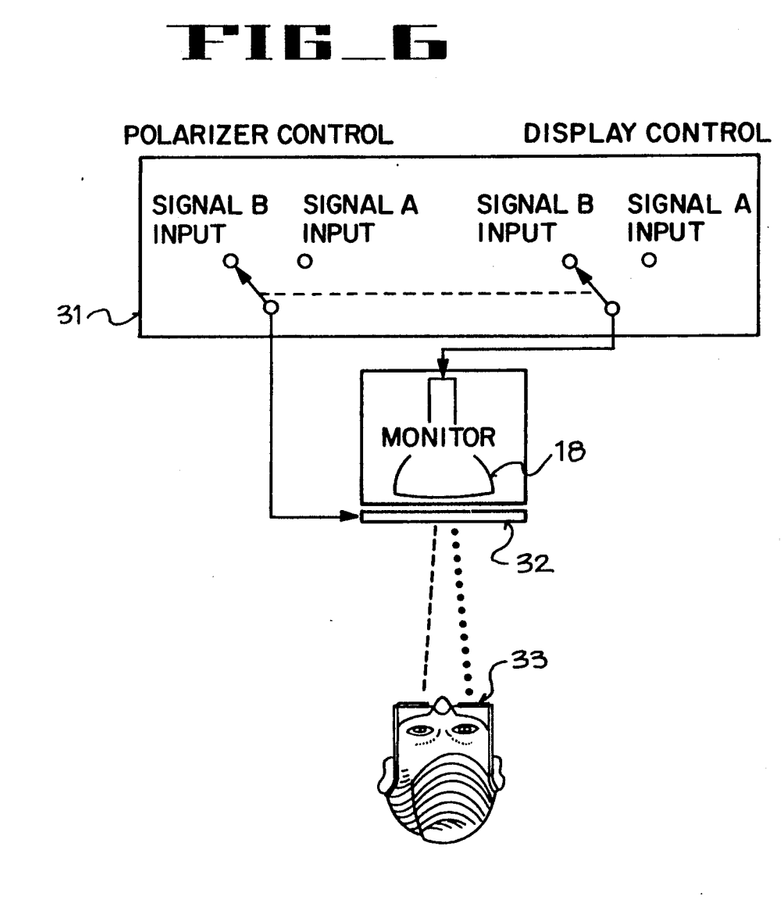
FIG. 6 is a schematic illustration of an alternative stereoscopic viewing technique for a stereoscopic radiographic inspection system according to the present invention.

In a variation of the stereoscopic display system 17 illustrated in FIG. 6, instead of having a synchronously switched polarizing screen and a pair of polarizing glasses, the stereoscopic display synchronizer 31 synchronously actuates electro-optical shutters covering the eyes of the observer so that the series of visual X-ray images displayed on the monitor 18 by the Signal A series is visible only to one eye of the observer, and the Signal B series is visible only to the other eye of the observer. The observer is thereby enabled to perceive the two series of visual X-ray images as a stereoscopic pair.

In another variation, the stereoscopic display synchronizer 13 shown in FIG. 6 could comprise a conventional color monitor on which the unequally delayed Signal A series and Signal B series of electronic signals produce visual X-ray images of two different complementary colors (e.g., red and green). Color filter glasses of the same two complementary colors are worn by the observer, so that the series of visual X-ray images produced on the color monitor by the Signal A series is predominantly visible to one eye of the observer, and so that the Signal B series is predominantly visible to the other eye of the observer. The observer is thereby enabled to perceive the two series of visual X-ray images as a stereoscopic pair.

The present invention has been described above in terms of particular embodiments. However, other embodiments would be apparent to practitioners skilled in the art of radiographic inspection upon perusal of the above description and the accompanying drawing. Therefore, the foregoing specification of the invention is to be considered merely as illustrative of the invention, which is defined more generally by the following claims and their equivalents.

We claim:

1. A method of inspecting a test object in stereoscopic view, said method comprising the steps of:
   a) generating a beam of penetrating radiation from a single source, said single source producing a single focal spot;
   b) causing relative motion of said test object with respect to said beam so that said test object is irradiated by said beam in a sequence of more than two different positions;
   c) converting radiation from said single source that has penetrated said test object in said sequence of more than two different positions into a series of electronic image signals, said series of electronic image signals corresponding to said sequence of more than two different positions in which said test object is irradiated;
   d) storing said series of electronic image signals;
   e) retrieving a series of pairs of electronic image signals from said stored series of electronic image signals, where the two electronic image signals in each retrieved pair of said series of pairs of electronic image signals are spatially separated from each other by a distance corresponding to a stereoscopic spatial separation, each electronic image signal functioning both as a left electronic image of one retrieved pair and as a right electronic image of another retrieved pair;
   f) displaying said series of pairs of electronic image signals on a stereoscopic display system as a series of pairs of visual images of said test object; and
   g) viewing said series of pairs of visual images of said test object so that appropriate visual images are viewed by corresponding left and right eyes of a human observer in sequence to produce a series of stereoscopic images.

2. The method of claim 1 wherein the step of generating said beam of penetrating radiation comprises generating an X-ray beam.

3. The method of claim 1 wherein the step of causing relative motion of said test object with respect to said beam comprises translating said test object through said beam.

4. The method of claim 3 wherein said test object is translated generally perpendicularly with respect to said beam.

5. The method of claim 1 wherein the step of causing relative motion of said test object with respect to said beam comprises rotating said test object in said beam.

6. The method of claim 1 wherein the step of displaying said series of pairs of electronic image signals as a series of pairs of visual images of said test object comprises displaying said series of pairs of electronic image signals as a pair of alternating display fields on a single monitor by means of a stereoscopic display synchronizer; and wherein the step of viewing said series of pairs of visual images of said test object comprises:
   a) synchronously switching a polarizing screen positioned in front of said monitor from a first polarization to a second polarization; and
   b) viewing the alternating display fields on said monitor through a pair of polarizing glasses, said polarizing glasses producing cross-polarization with respect to said polarizing screen so that one visual image from each pair of said series of pairs of visual images is visible only to one eye, and so that the other visual image from each pair of said series of pairs of visual images is visible only to the other eye of the human observer.

7. The method of claim 1 wherein the two electronic image signals in each retrieved pair of said series of pairs of electronic image signals are separated from each other by digital buffer means.

8. The method of claim 2 wherein the step of converting X-ray radiation that has penetrated said test object in said sequence of more than two different positions into said series of electronic image signals corresponding to said sequence of more than two different positions comprises causing said X-ray radiation after having penetrated said test object to impinge upon an image intensifier to produce a series of visual images of said test object, and converting said series of visual images of said test object into said series of electronic image signals by means of a video camera.

9. The method of claim 2 wherein the step of converting X-ray radiation that has penetrated said test object in said sequence of more than two different positions into said series of electronic image signals corresponding to said sequence of more than two different positions comprises causing said X-ray radiation after having penetrated said test object to impinge upon a phosphor screen to produce a series of visual images of said test object, and converting said series of visual images of said test object into said series of electronic image signals by means of a video camera.

10. The method of claim 2 wherein the step of converting X-ray radiation that has penetrated said test object in said sequence of more than two different positions into said series of electronic image signals corresponding to said sequence of more than two different positions comprises causing said X-ray radiation after having penetrated said test object to impinge upon a rare earth screen to produce a series of visual images of said test object, and converting said series of visual images of said test object into said series of electronic image signals by means of a video camera.

11. The method of claim 1 wherein the step of converting radiation that has penetrated said test object in said sequence of more than two different positions into said series of electronic image signals corresponding to said sequence of more than two different positions comprises:
  a) causing said radiation after having penetrated said test object to impinge upon means for producing a series of visual images of said test object; and
  b) causing said series of visual images of said test object to be converted into said series of electronic image signals.

12. The method of claim 1 wherein the step of displaying said series of pairs of electronic image signals on said stereoscopic display system as a series of pairs of visual images of said test object comprises displaying one electronic image signal from each of said pairs of electronic image signals in succession on one monitor, and displaying the other electronic image signal from each of said pairs of electronic image signals in succession on another monitor; and wherein the step of viewing said series of pairs of visual images of said test object comprises viewing the visual images displayed on said monitors with said corresponding eyes of the human observer.

13. The method of claim 12 wherein the step of viewing said series of pairs of visual images of said test object is performed using a viewing system that comprises refracting elements arranged so that the visual images displayed on said one monitor are visible only to one eye, and so that the visual images displayed on said other monitor are visible only to the other eye of the human observer.

14. The method of claim 13 wherein said viewing system also comprises reflecting elements.

15. The method of claim 12 wherein the step of viewing said series of pairs of visual images of said test object is performed using a viewing system that comprises:
  a) a pair of polarizing screens, each polarizing screen being positioned in front of a corresponding one of said monitors;
  b) a beamsplitter positioned to combine the visual images displayed on said one monitor with the visual images displayed on said other monitor; and
  c) a pair of polarizing glasses, said polarizing glasses being worn adjacent corresponding eyes of the observer to permit the visual images displayed on said one monitor to be visible only to one eye, and to permit the visual images displayed on said other monitor to be visible only to the other eye of the human observer.

16. An apparatus for inspecting a test object in stereoscopic view, said apparatus comprising:
  a) means for generating a beam of penetrating radiation from a single source, said single source producing a single focal spot;
  b) means for causing relative motion of said test object with respect to said beam so that said test object is irradiated by said beam in a sequence of more than two different positions;
  c) means for converting radiation from said single source that has penetrated said test object in said sequence of more than two different positions into a series of electronic image signals, said series of electronic image signals corresponding to said sequence of more than two different positions in which said test object is irradiated;
  d) means for storing said series of electronic image signals;
  e) means for retrieving a series of pairs of electronic image signals from said stored series of electronic image signals, where the two electronic image signals in each retrieved pair of said series of pairs of electronic image signals are separated from each other by a distance corresponding to a stereoscopic spatial separation, each electronic image signal functioning both as a left electronic image of one retrieved pair and as a right electronic image of another retrieved pair;
  f) means for displaying said series of pairs of electronic image signals on a stereoscopic display system as a series of pairs of visual images of said test object; and
  g) means for viewing said series of pairs of visual images of said test object so that appropriate visual images are viewed by corresponding left and right eyes of a human observer in sequence to produce a series of stereoscopic images.

17. The apparatus of claim 16 wherein said means for displaying said series of pairs of electronic image signals on said stereoscopic display system as a series of pairs of visual images of said test object comprises a pair of video monitors, a first one of said pair of video monitors displaying a first electronic image signal from each one of said pairs of electronic image signals in succession, a second one of said pair of video monitors displaying a second electronic image signal from each one of said pairs of electronic image signals in succession; and wherein said means for viewing said series of pairs of visual images of said test object comprises means for causing the visual images displayed on said first one of said pair of video monitors to be visible only to the observer's left eye, and for causing the visual images displayed on said second one of said pair of video monitors to be visible only to the observer's right eye.

18. The apparatus of claim 17 wherein said means for viewing said series of pairs of visual images of said test object comprises:
 a) a pair of polarizing screens, each polarizing screen being positioned in front of a corresponding one of said first and second video monitors;
 b) a beamsplitter positioned to combine said first series of visual images displayed on said first video monitor with said second series of visual images displayed on said second video monitor; and
 c) a pair of polarizing glasses to be worn adjacent corresponding eyes of the observer, said polarizing glasses in combination with said pair of polarizing screens causing said first series of said pair of series of visual images displayed on said first monitor to be visible only to one eye of the observer, and causing said second series of said pair of series of visual images displayed on said second monitor to be visible only to the other eye of the observer.

19. The apparatus of claim 17 wherein said means for viewing said pair of series of visual images comprises a system of lenses and mirrors arranged so as to focus said first series of said pair of series of visual images onto the observer's left eye, and so as to focus said second series of said pair of series of visual images onto the observer's right eye.

20. The apparatus of claim 17 wherein said means for viewing said pair of series of visual images comprises a prism system arranged so as to direct said first series of said pair of series of visual images onto the observer's left eye, and so as to direct said second series of said pair of series of visual images onto the observer's right eye.

21. The apparatus of claim 16 wherein said means for causing relative motion of said test object with respect to said beam comprises means for translating said test object through said beam.

22. The apparatus of claim 21 wherein said means for causing relative motion of said test object with respect to said beam comprises means for translating said test object generally perpendicularly with respect to said beam.

23. The apparatus of claim 16 wherein said means for generating said beam of penetrating radiation comprises an X-ray source for generating a beam of X-ray radiation.

24. The apparatus of claim 23 wherein said means for converting X-ray radiation that has penetrated said test object in said sequence of more than two different positions into said series of electronic image signals comprises:
 a) means for producing a series of visual images of said test object; and
 b) means for converting said series of visual images of said test object into said series of electronic image signals.

25. The apparatus of claim 24 wherein said means for producing said series of visual images of said test object comprises a rare earth screen.

26. The apparatus of claim 24 wherein said means for producing said series of visual images of said test object comprises a phosphor screen.

27. The apparatus of claim 24 wherein said means for producing said series of visual images of said test object comprises an image intensifier.

28. The apparatus of claim 24 wherein said means for converting said series of visual images of said test object into said series of electronic image signals comprises a video camera.

29. The apparatus of claim 16 wherein said means for displaying said series of pairs of electronic image signals on said stereoscopic display system as a series of pairs of visual images of said test object comprises a video monitor and a stereoscopic display synchronizer, said stereoscopic display synchronizer causing said series of pairs of visual images of said test object to be presented as alternating display fields on said video monitor.

30. The apparatus of claim 29 wherein said means for viewing said series of pairs of visual images of said test object comprises:
 a) a polarizing screen positioned in front of said video monitor, said polarizing screen being switchable from a first polarization to a second polarization synchronously with respect to the presentation of said alternating display fields on said video monitor; and
 b) a pair of polarizing glasses to be worn adjacent corresponding eyes of the observer, said polarizing glasses in combination with said synchronously switchable polarizing screen causing one series of visual images to be visible only to one eye of the observer, and causing the other series of visual images to be visible only to the other eye of the observer.

31. The apparatus of claim 16 wherein the two electronic image signals in each pair of said series of pairs of electronic image signals retrieved from said stored series of electronic image signals are separated from each other by digital buffer means.

32. A method of inspecting a test object in stereoscopic view, said method comprising the steps of:
 a) generating a beam of penetrating radiation from a single source, said single source producing a single focal spot;
 b) causing relative motion of said test object with respect to said beam so that said test object is irradiated by said beam in a sequence of more than two different positions at constant spatial displacements;
 c) converting radiation from said single source that has penetrated said test object in said sequence of more than two different positions into a series of real-time electronic image signals corresponding to said different positions;
 d) storing said series of real-time electronic image signals;
 e) forming a series of pairs of electronic image signals, each pair of said series of pairs of electronic image signals consisting of:
  (i) a real-time electronic image signal currently being stored, and
  (ii) an electronic image signal retrieved from said stored series of real-time electronic image signals, each pair of said series of pairs of electronic image signals having a constant spatial separation corresponding to a stereoscopic separation, each electronic image signal functioning both as a left electronic image of one pair and as a right electronic image of another pair; and f) displaying said series of pairs of electronic image signals to form a series of stereoscopic visual images corresponding to said sequence of different positions in which said test object is irradiated.

33. An apparatus for inspecting a test object in stereoscopic view, said apparatus comprising:
   a) means for generating a beam of penetrating radiation from a single source, said single source producing a single focal spot;
   b) means for causing relative motion of said test object with respect to said beam so that said test object is irradiated by said beam in a sequence of more than two different positions;
   c) means for converting radiation from said single source that has penetrated said test object in said sequence of more than two different positions into a series of real-time electronic image signals corresponding to said different positions in which said test object is irradiated;
   d) means for storing said series of real-time electronic image signals;
   e) means for selectively retrieving stereoscopic pairs of electronic image signals from said stored series of real-time electronic image signals to form a series of pairs of electronic image signals, each electronic image signal functioning both as a left electronic image of one retrieved pair and as a right electronic image of another retrieved pair; and
   f) means for displaying said series of pairs of electronic image signals to form a series of stereoscopic visual images corresponding to said sequence of different positions in which said test object is irradiated.

34. An apparatus for inspecting a test object in stereoscopic view, said apparatus comprising:
   a) means for generating a beam of penetrating radiation from a single source, said single source producing a single focal spot;
   b) means for causing relative motion of said test object with respect to said beam so that said test object is irradiated by said beam in a sequence of more than two different positions at constant spatial displacements;
   c) means for converting radiation from said single source that has penetrated said test object in said sequence of more than two different positions into a series of real-time electronic image signals corresponding to said different positions;
   d) means for storing said series of real-time electronic image signals;
   e) means for forming a series of pairs of electronic image signals, each pair of said series of pairs of electronic image signals consisting of:
      (i) a real-time electronic image signal currently being stored, and
      (ii) an electronic image signal retrieved from said stored series of real-time electronic image signals, each pair of said series of pairs of electronic image signals having a constant spatial separation corresponding to a stereoscopic separation, each electronic image signal functioning both as a left electronic image of one pair and as a right electronic image of another pair; and
   f) means for displaying said series of pairs of electronic image signals to form a series of stereoscopic visual images corresponding to said sequence of different positions in which said test object is irradiated.

35. A method of inspecting a test object in stereoscopic view, said method comprising the steps of:
   a) generating a beam of penetrating radiation from a single source, said single source producing a single focal spot;
   b) causing relative motion of said test object with respect to said beam so that said test object is irradiated by said beam in a sequence of more than two different positions at constant spatial displacements;
   c) converting radiation from said single source that has penetrated said test object in said sequence of more than two different positions into a series of real-time electronic image signals corresponding to said different positions;
   d) storing said series of real-time electronic image signals;
   e) selectively retrieving stereoscopic pairs of electronic image signals from said stored series of real-time electronic image signals to form a series of pairs of electronic image signals, each electronic image signal functioning both as a left electronic image of one retrieved pair and as a right electronic image of another retrieved pair; and
   f) displaying said series of pairs of electronic image signals to form a series of stereoscopic visual images corresponding to said sequence of different positions in which said test object is irradiated.

* * * * *